United States Patent
Yoo et al.

(10) Patent No.: US 12,032,741 B2
(45) Date of Patent: *Jul. 9, 2024

(54) SYSTEMS AND METHODS FOR INCREASING CONTROL USING A NEURAL SIGNAL

(71) Applicant: Synchron Australia Pty Limited, Melbourne (AU)

(72) Inventors: Peter Eli Yoo, Brooklyn, NY (US); James Bennett, Elwood (AU); Nicholas Lachlan Opie, Melbourne (AU)

(73) Assignee: Synchron Australia Pty Limited, Melbourne (AU)

( * ) Notice: Subject to any disclaimer, the term of this patent is extended or adjusted under 35 U.S.C. 154(b) by 0 days.

This patent is subject to a terminal disclaimer.

(21) Appl. No.: 18/184,558

(22) Filed: Mar. 15, 2023

(65) Prior Publication Data

US 2023/0288987 A1 Sep. 14, 2023

Related U.S. Application Data

(63) Continuation of application No. 17/818,227, filed on Aug. 8, 2022, now Pat. No. 11,630,517.

(60) Provisional application No. 63/267,112, filed on Jan. 25, 2022.

(51) Int. Cl.
*G06F 3/01* (2006.01)
*G06F 3/0484* (2022.01)

(52) U.S. Cl.
CPC ............ *G06F 3/015* (2013.01); *G06F 3/0484* (2013.01)

(58) Field of Classification Search
CPC .............................. G06F 3/0484; G06F 3/015
See application file for complete search history.

(56) References Cited

U.S. PATENT DOCUMENTS

| | | | |
|---|---|---|---|
| 7,333,030 B2 * | 2/2008 | Baranov | G01S 13/933 340/963 |
| 8,506,300 B2 * | 8/2013 | Baranov | G09B 9/085 340/963 |
| 9,311,670 B2 * | 4/2016 | Hoffberg | H04W 4/029 |
| 9,818,136 B1 * | 11/2017 | Hoffberg | G07F 17/32 |
| 10,485,968 B2 | 11/2019 | Opie et al. | |
| 10,512,555 B2 | 12/2019 | John et al. | |
| 10,575,783 B2 | 3/2020 | Oxley | |
| 10,729,530 B2 | 8/2020 | Opie et al. | |
| 11,093,038 B2 | 8/2021 | Yoo | |
| 11,141,584 B2 | 10/2021 | Opie et al. | |
| 11,376,138 B2 * | 7/2022 | John | A61F 2/72 |
| 11,630,517 B1 | 4/2023 | Yoo et al. | |
| 2007/0103340 A1 * | 5/2007 | Baranov | G01S 13/93 340/968 |
| 2011/0199370 A1 * | 8/2011 | Chiang | G06T 7/33 345/442 |
| 2015/0352364 A1 * | 12/2015 | Meffin | A61N 1/36046 607/54 |

(Continued)

FOREIGN PATENT DOCUMENTS

WO WO 2023/147233 8/2023

*Primary Examiner* — David E Choi
(74) *Attorney, Agent, or Firm* — Levine Bagade Han LLP

(57) ABSTRACT

Systems and methods for a brain-computer interface (BCI) to increase a number of degrees of freedom (DOF) of one or more neural signals that are used to interact with the BCI.

19 Claims, 8 Drawing Sheets

(56) References Cited

U.S. PATENT DOCUMENTS

| | | | |
|---|---|---|---|
| 2016/0133150 A1* | 5/2016 | Sutz | G09B 17/04 |
| | | | 434/178 |
| 2018/0085047 A1* | 3/2018 | Hartings | A61B 5/369 |
| 2018/0303595 A1 | 10/2018 | Opie et al. | |
| 2019/0121522 A1* | 4/2019 | Davis | G06V 40/28 |
| 2019/0336748 A1 | 11/2019 | Oxley | |
| 2020/0016396 A1 | 1/2020 | Yoo | |
| 2020/0078195 A1 | 3/2020 | John et al. | |
| 2020/0269123 A1* | 8/2020 | Sachs | A63B 71/0622 |
| 2020/0352697 A1 | 11/2020 | Opie et al. | |
| 2021/0137542 A1 | 5/2021 | Oxley et al. | |
| 2021/0169417 A1* | 6/2021 | Burton | A61B 5/4857 |
| 2021/0342004 A1 | 11/2021 | Yoo | |
| 2021/0365117 A1 | 11/2021 | Yoo et al. | |
| 2021/0373665 A1 | 12/2021 | Yoo | |
| 2021/0378595 A1 | 12/2021 | Oxley | |
| 2021/0393948 A1 | 12/2021 | Opie et al. | |
| 2022/0075793 A1* | 3/2022 | Jezewski | G06N 5/04 |
| 2022/0101593 A1* | 3/2022 | Rockel | A63F 13/426 |

* cited by examiner

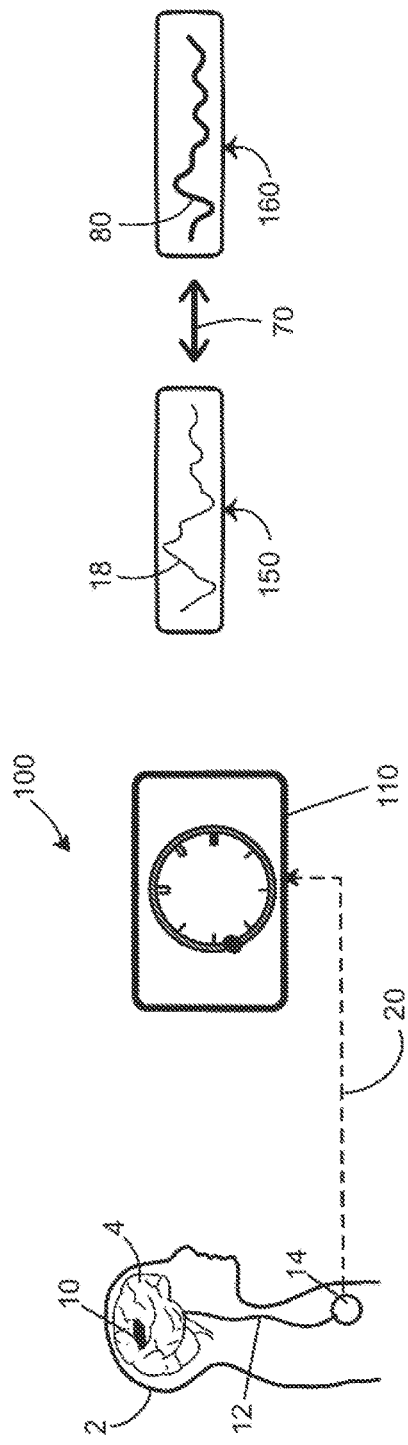
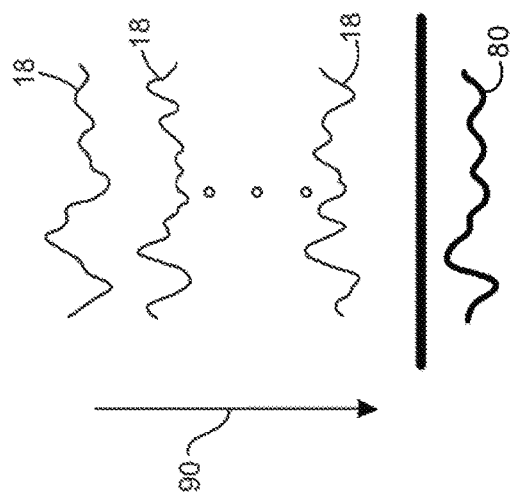
FIG. 6A
FIG. 6B

SYSTEMS AND METHODS FOR INCREASING CONTROL USING A NEURAL SIGNAL

CROSS-REFERENCE TO RELATED APPLICATIONS

This application is a continuation of U.S. patent application Ser. No. 17/818,227 filed Aug. 8, 2022, which is a non-provisional of U.S. Provisional application No. 63/267,112 filed Jan. 25, 2022, the contents of each of which are incorporated herein by reference.

BACKGROUND

1. Technical Field

This disclosure generally relates to systems and methods for increasing increase the number of degrees of freedom (DOF) when using a signal to interact with a control system. For example, such a control system can include a brain-computer interface (BCI), where one or more neural signals have increased degrees of freedom when used to interact with the BCI.

2. Background of the Art

In conventional brain-computer interfaces (BCIs), the BCI user generates an endogenous, exogenous signal, or a combination of signals to provide instructions to the BCI. Typically, an endogenous signal is a signal that the individual generates internally. Such endogenous signals can include neural signals detected by sensors that measure electrical impulses produced when the individual generates a thought, moves a muscle (either through actual movement or imagined movement in the case of a paralyzed individual), etc. Exogenous signals can include any signal where the individual takes an action that is measured or generated externally external to the individual. For example, exogenous signals can include a signal generated when the individual triggers an external mechanism or electronic device (e.g., a mouse click, screen contact/tap, keyboard click, voice command, etc.), a signal received by an inertial sensor that uses inertia to detect physical movement of a body part of the individual. A signal is received using a camera-type device that detects movement of a body part of an individual (e.g., an eye movement detector, a body-movement detector, etc.), sip and puff controls (typically used for wheelchairs), etc.

Many conventional BCI systems are limited because the generation of a signal is usually limited to a single command to control the BCI system. In addition, many BCI control systems must translate noisy signals from the individual into control signals. In many cases, conventional BCIs use one signal to one command or one degree of freedom. Therefore, systems that do not have increased degrees of freedom (i.e., a user-generated signal that can be used to produce multiple commands) must map a number of user-generated signals each to a specific BCI command. However, being able to predict a variety of the user's intent to produce multiple user-generated signals (e.g., neural signals associated with left- or right-hand movement) based on spatial information is not trivial due to a variety of mechanical, electrical, and physiological factors. This presents a challenge for conventional BCI systems to offer reliable, multiple degrees of freedom of control. Therefore, many conventional BCI systems have decreased usability and decreased commercial viability for BCI systems that could otherwise help potential users of the BCI systems, especially individuals severely disabled or paralyzed individuals who have very few options in engaging with the world.

BRIEF SUMMARY OF THE INVENTION

Systems and methods of control using neural-related signals are disclosed, including methods of using the same. In the variations where the signal is a neural-related signal, such a signal can be any signal (e.g., electrical, biochemical) detectable from the biological medium, can be any feature or features extracted from a detected neural-related signal (e.g., via a computer processor), or both, where extracted features can be or can include characteristic information about the thoughts of the patient so that different thoughts can be distinguished from one another. As another example, the neural-related signals can be electrical signals, can be any signal (e.g., biochemical signal) caused by an electrical signal, can be any feature or features extracted from a detected neural-related signal (e.g., via a computer processor), or any combination thereof. The neural-related signals can be neural signals such as brainwaves. Where the biological medium is inside the patient's skull, the neural-related signals can be, for example, brain signals (e.g., detected from brain tissue) that result from or are caused by the patient thinking of the thought. In this way, the neural-related signals can be brain-related signals, such as electrical signals from any portion or portions of the patient's brain (e.g., motor cortex, sensory cortex). Where the biological medium is outside the patient's skull, the neural-related signals can be, for example, electrical signals associated with muscle contraction (e.g., of a body part such as an eyelid, an eye, the nose, an ear, a finger, an arm, a toe, a leg) that result from or are caused by the patient thinking of the thought. The thoughts (e.g., movement of a body part, a memory, a task) that the patient 8 thinks of when neural-related signals are being detected from their brain tissue can be the same or different than the thoughts 9 that the patient 8 thinks of when neural-related signals are being detected from non-brain tissue. The neural interface can be positionable inside the patient's brain, outside the patient's brain, or both.

The methods and systems herein relate to a method for interfacing an individual with an electronic device. In one variation, the interface includes a brain-computer interface and the method includes: providing a visual display to the individual, where the visual display includes a timing indicator, an initial reference point and a first identified cue point associated with a first command, the first identified cue point being spaced along a path at a first distance from the initial reference point, the visual display configured to show the timing indicator moving along an entirety of the path starting at the initial reference point and ending after a path length, where time of movement of the timing indicator over the first distance includes a first duration time; monitoring the individual to obtain a monitoring signal while displaying the visual display; establishing a first review portion of the monitoring signal starting at an initial time that corresponds to when the timing indicator is at the initial reference point and ending after the first duration time; assessing the first review portion for a first evidence signal that occurs within the first review portion; and issuing the first command in the brain-computer interface if the first evidence signal matches a first predetermined signal pattern.

In some variations, the techniques described herein relate to a method wherein the visual display further includes a second identified cue point associated with a second command, where the second identified cue point is spaced along the path at a second distance from the initial reference point, where the second distance is greater than the first distance and where time of movement of the timing indicator over the second distance includes a second duration time; establishing a second review portion of the monitoring signal starting at the initial time and ending after the second duration time obtaining a second evidence signal that occurs towards an end of the second review portion; and issuing the second command in the brain-computer interface if the second evidence signal matches a second predetermined signal pattern.

Variations of the systems and methods can include a situation where the first predetermined signal pattern and the second predetermined signal pattern are similar. Alternatively, the first predetermined signal pattern can be different from the second predetermined signal pattern.

The systems and methods can also relate to methods wherein providing the visual display to the individual, including showing a non-identified cue point that is spaced along the path from both from the initial reference point and the first identified cue point.

The techniques described herein can also relate to a method, further including associating non-identified cue point with an additional command.

Variations of the systems and methods include a predetermined signal pattern that is compiled from one or more previously accumulated evidence signal patterns. Moreover, the methods and systems can include altering the first predetermined signal pattern using the first evidence signal.

The techniques described herein can also relate to monitoring the individual to obtain the monitoring signal by monitoring the individual for a signal selected from a group consisting of an endogenous neural signal from the individual, an auditory signal from the individual, a physical movement of a body part of the individual, and a key selection by the individual.

The signals described herein can comprise an endogenous neural signal that are signals generated by a neural implant in the individual configured to detect neural activity. Such neural activity can include neural activity selected from a group consisting of an affirmative thought, movement of a body part, and imagined movement of a body part.

In some aspects, the techniques described herein relate to a system for allowing an individual to interface with an electronic device. For example, such an interface can include the control of a brain-computer interface, where the system includes: a device for monitoring the individual to obtain a monitoring signal over a time period; a control system for recording the monitoring signal; a display configured to provide a visual display to the individual including a timing indicator, an initial reference point and a first identified cue point associated with a first control command, where the visual display shows the timing indicator moving along a path that starts at the initial reference point and ends after a path length, where movement of the timing indicator over the path occurs after a cycle time, where the first identified cue point is spaced from the initial reference point along the path by a first distance such that a first duration time includes a time of movement of the timing indicator from the initial reference point to the first identified cue point; wherein the control system is configured to: select an evidence signal from the monitoring signal by selecting a portion of the monitoring signal starting at when the timing indicator is at the initial reference point; evaluate the evidence signal for a first predetermined signal pattern occurring after the first duration time from a start of the evidence signal; and generate a first confirmation signal in the brain-computer interface only upon identifying the first predetermined signal pattern during evaluating the evidence signal, where the first confirmation signal confirms selection of the first control command by the individual.

In some aspects, the techniques described herein relate to a system wherein the display further includes a second identified cue point associated with a second command, where the second identified cue point is spaced along the path at a second distance from the initial reference point, where the second distance is greater than the first distance and where the time of movement of the timing indicator over the second distance includes a second duration time; wherein the control system is configured to establish a second review portion of the monitoring signal starting at the reference point and ending after the second duration time obtain a second evidence signal that occurs towards an end of the second review portion; and issue the second command in the brain-computer interface if the second evidence signal matches a second predetermined signal pattern.

The subject matter disclosed herein is related to the following publications and patents, the entirety of all of which are incorporated by reference: US20210378595 published Dec. 9, 2021; US20210393948 published Dec. 23, 2021; US20180303595* published Oct. 25, 2018; US20200352697 published Nov. 12, 2020; US20200078195 published Mar. 12, 2020; US20190336748 published Nov. 7, 2019; US20200016396 published Jan. 16, 2020; US20210373665 published Dec. 2, 2021; US20210342004 published Nov. 4, 2021; US20210137542 published May 13, 2021; US20210365117 published Nov. 25, 2021; and U.S. Pat. No. 10,575,783 issued Mar. 3, 2020; U.S. Pat. No. 10,485,968 issued Nov. 26, 2019; U.S. Pat. No. 11,141,584 issued Oct. 12, 2021; U.S. Pat. No. 10,729,530 issued Aug. 4, 2020; U.S. Pat. No. 10,512,555 issued Dec. 24, 2019; U.S. Pat. No. 11,093,038 issued Aug. 17, 2021.

BRIEF SUMMARY OF THE DRAWINGS

The drawings shown and described are exemplary embodiments and non-limiting. Like reference numerals indicate identical or functionally equivalent features throughout.

FIGS. 6A and 6B illustrate a system where the signal (e.g., an endogenous signal) includes a significant amount of noise.

DETAILED DESCRIPTION

The present disclosure includes systems and methods for an interface between an individual and a computer interface that controls one or more electronic devices. In one variation of such methods and systems, the individual generates a signal in order to interact with an electronic system that controls one or more electronic devices. The signal can be an endogenous signal or an exogenous signal, as described herein. The systems and methods described herein increase the degrees of freedom associated with the signal to allow the use of a signal to control or otherwise interact with a control system. While the methods and systems described herein are discussed with respect to a BCI system, the methods and systems can be used in any electronic control system. Variations of the methods and systems use such an electronic control system to control any device, especially any electronic devices, mechanism with electronic controls, and/or such devices integrated with the electronic control system. The methods and systems described herein are also useful to provide controls for a control system utilizing a noisy signal source.

Figure 1A:
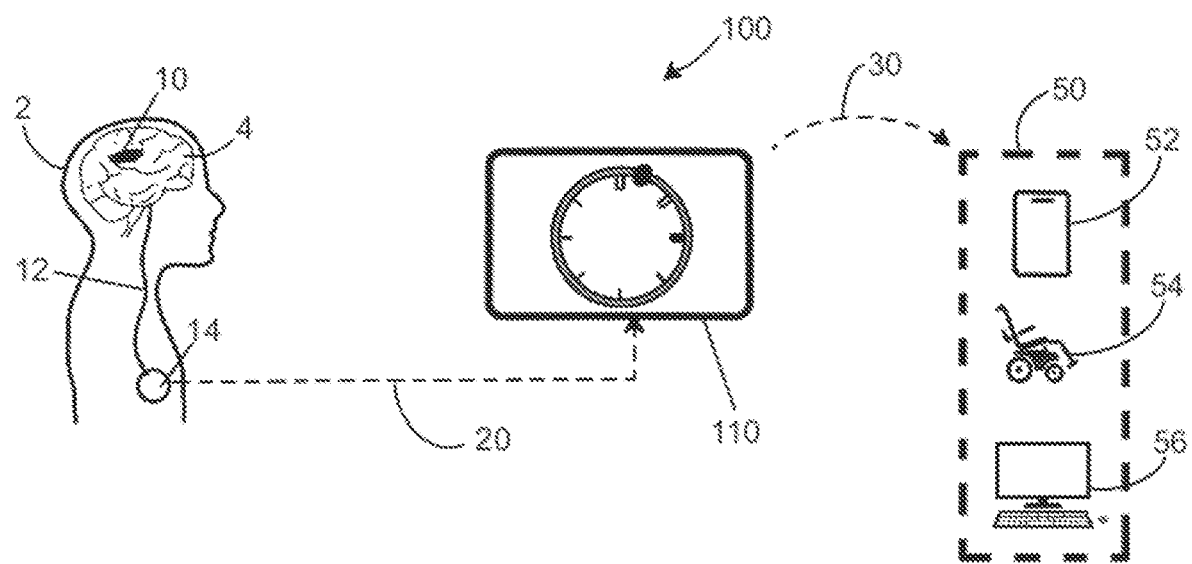
FIG. 1A shows an illustration of an individual using an interface system as described herein.

FIG. 1A shows an illustration of an individual 2 using an interface system 100 as described herein. The illustrated figure shows the use of a BCI system 100 with an improved interface display 110 to increase the degrees of freedom when using a single signal 20 to control one or more external devices 50.

FIG. 1A illustrates the individual 2 having an implant 10 positioned within a brain 4 (e.g., using a vessel of the brain or directly into brain tissue). The implant 10 detects electrical activity associated with brain activity. The BCI transmits the detected electrical activity/brain activity via a lead 12 to a controller unit 14 that generates and/or transmits (either via a wired or wirelessly) a signal 20 associated with the identified brain activity. In this variation, the signal is endogenous since its origination is within the individual. Any type of BCI can be used in association with the improved interface disclosed herein. For example, additional variations of BCI's can include BCI systems having external electrodes positioned on an exterior of the individual, electrodes that are implanted directly into the brain through a skull of the individual, and a combination of any type of electrode positioning configuration. Again, the methods and systems of the present disclosure are not limited to BCI systems. Instead, the improved interface can be employed in any control system.

The system 100 includes a visual display 110 that is viewable by the individual 2. As discussed below, the visual display 110 guides the individual 2 to provide a signal 20 using a temporal pattern. Upon identification of the signal 20 and temporal pattern, the BCI 100 issues a command 30 that can be delivered to one or more devices 50 coupled to the BCI 100. FIG. 1A further illustrates the devices 50, including such items as a personal electronic device 52 (e.g., a smartphone or electronic tablet), a mobility device 54 (e.g., an electronically controlled wheelchair), a computer 56, an electronic prosthetic (not shown), or any other electronic device. The visual display 110 can be separate from the devices 50 or can be integrated into any device 50.

Figure 1B:
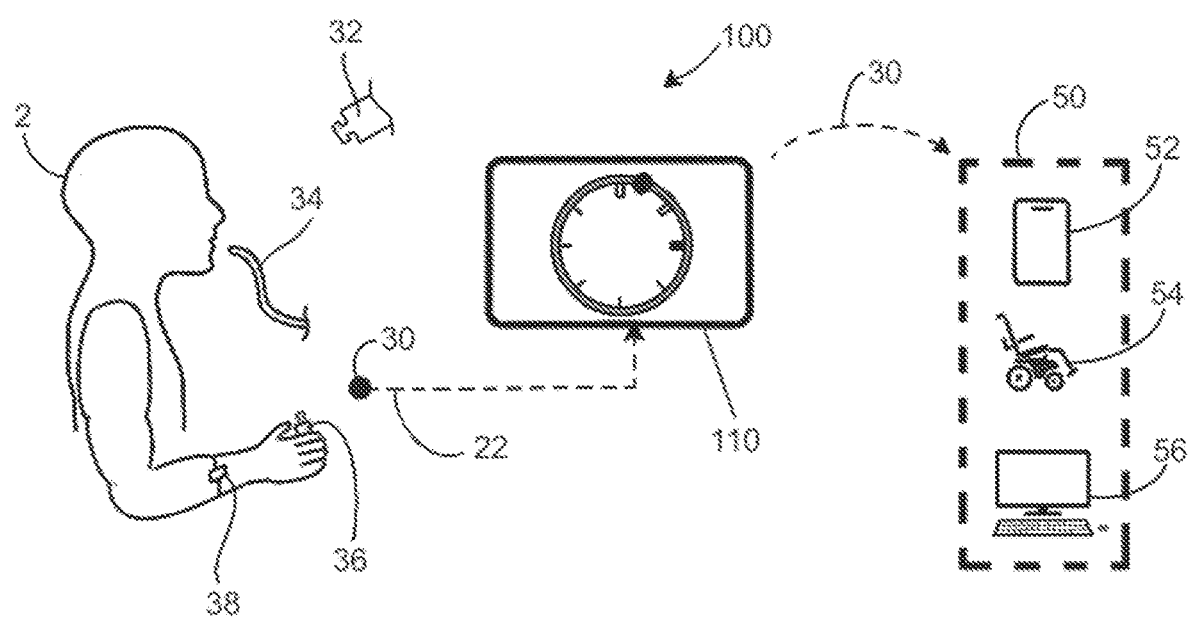
FIG. 1B illustrates an arrangement similar to FIG. 1A, but with a BCI that is driven by an exogenous signal.

FIG. 1B illustrates an arrangement similar to FIG. 1A, but with a BCI that is driven by an exogenous signal (i.e., where an external device 30 generates a signal 22 used by the system 100). For example, the external device can comprise one or more of an external camera 32 (e.g., an eye or body motion tracking camera), a puff device 34, a keyboard or mechanical switch (36), a movement sensor 38, etc.

FIGS. 2A-2D provide an illustration of an individual 3 using an improved interface to interact with a control system such as a BCI. As shown, the individual 2 is provided with a visual display 110 having a timing indicator 112 that moves along a path 114 containing any number of switches or cue points 122, 124, 126, etc. As discussed below, the cue points 122, 124, 126 can provide a visual indicator that informs the individual 2 to generate a signal in order to execute a command in the control system.

Figure 2A:
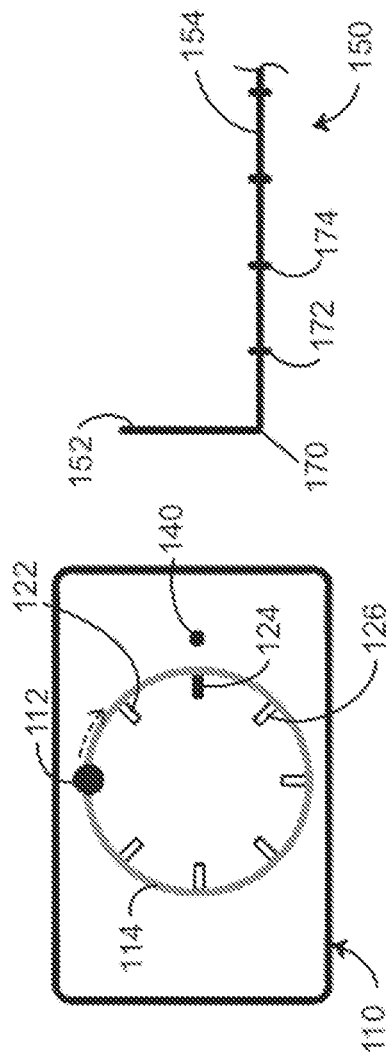
FIGS. 2A-2D provides illustrations of an individual using an improved interface to interact with a control system such as a BCI.
Figure 2A:
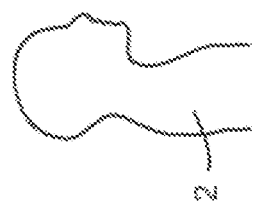

In some variations of the interface, the timing indicator 112 repeats movement over the path 114 after each cycle. In the example shown in FIG. 2A, the path 114 can be visible to the individual 2 (e.g., the circle shown). Alternatively, the timing indicator 112 can move along a path that is not visibly shown on the display. FIG. 2A also illustrates the timing indicator 112 moving in a clockwise direction. However, alternate variations include movement of the timing indicator in a counterclockwise direction or even alternating directions after completion of one or more cycles. As discussed below, the path 114 can be continuous (e.g., a circle or any other closed shape) or can be discontinuous as discussed below (e.g., a line or any other non-closed shape).

FIGS. 2A to 2D also illustrates a signal response graph 150, which represents a signal that is generated by the individual 2. As noted above, such a monitoring signal can be endogenous, exogenous, or a combination thereof. In some variations, the signal response graph 150 is visually observable. However, the signal response graph 150 shown in FIGS. 2A to 2D is intended to illustrate the use of temporal information with signal identification to increase the degrees of freedom of a system. In the example, the signal response graph 150 shows a magnitude 152 of the signal on a y-axis and time 154 on the x-axis with point 170 corresponding to the initial reference point 120 on the path 114 and points 172 and 174 corresponding to cue points 122 and 124 respectively.

FIG. 2A illustrates the timing indicator 112 at an initial reference point (120 shown in FIG. 2B) on the path 114. In this variation, the first identified cue point 124 is located at a 3 o'clock position. This first identified cue point will be associated with one or more commands to be delivered to the devices (shown in FIGS. 1A and 1B.) The first identified cue point is also spaced along a path at a first distance from the initial reference point. This provides a temporal dimension as discussed below. The visual display 110 shows the timing indicator 112 moving along an entirety of the path 114, starting at the initial reference point 120 and ending after a path length. Movement of the timing indicator over the first distance comprises a first duration time that is analyzed by the system as discussed below.

As shown, the system is configured, so that first identified cue point 124 is visually distinguishable to the individual 2. While the illustration of FIG. 2A shows the identified cue point 24 as being shaded or filled. Additional markers 140 can be provided to render an identified cue point as being visually apparent to the individual. In contrast, non-identified-cue point 122 can remain unidentified or can be made apparent to the individual 2 that it is not an identified cue point. In additional variations of the system and method, only identified cue points are visible, and un-identified cue points remain hidden. Clearly, identified cue points can be provided in any number of forms, including but not limited to visual, auditory, electrical, tactile stimulus, and a combination thereof.

Figure 2B:
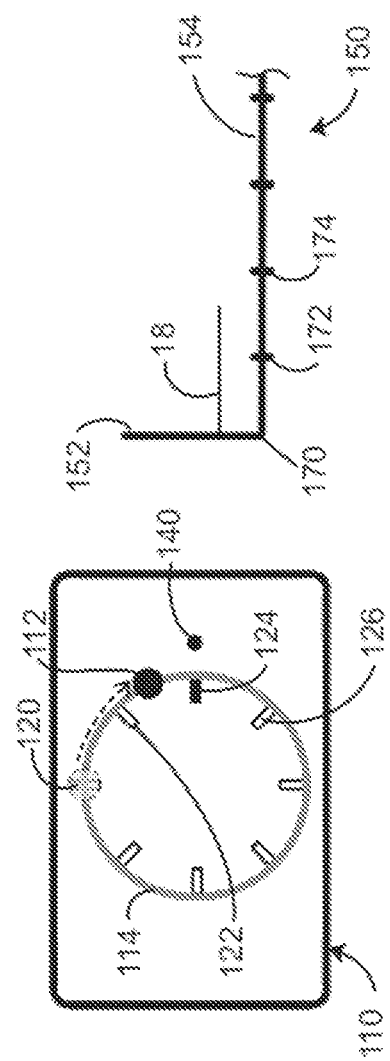
Figure 2B:

FIG. 2A also illustrates the signal response graph 150 as not showing a signal for illustration purposes only. FIG. 2B shows the timing indicator 112 moving along the path 114 towards an identified cue point 124. Accordingly, signal response graph 150 shows a monitoring signal 18 (one that is obtained by monitoring the individual 2), passing point 172 (corresponding to cue point 122), and approaching point 174 (where the display 110 shows the timing indicator 112 approaching a first identified cue point 124). Signal 18 is illustrated as being a single line for purposes of illustration of the present disclosure. In many systems, a monitoring signal comprises noise, as discussed below.

Figure 2C:
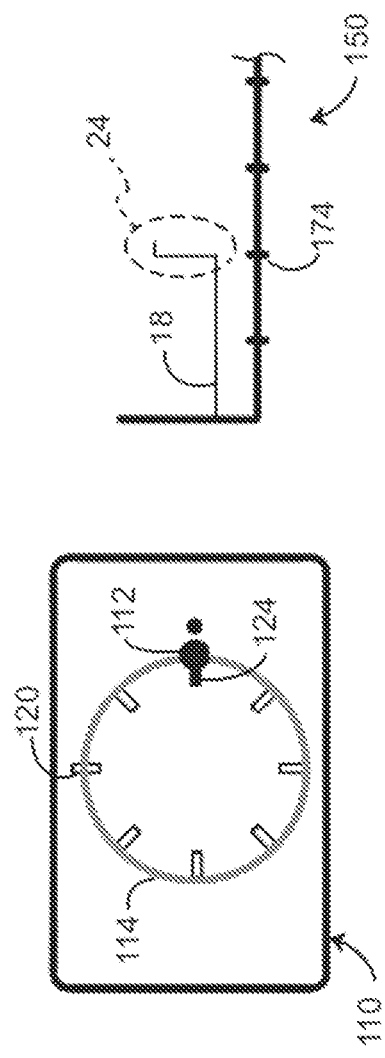
Figure 2C:
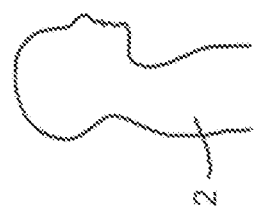

FIG. 2C shows the timing indicator 112 intersecting the first identified cue point 124. This instructs the individual 2 to take action. For a BCI, as shown in FIG. 1A, such action can include a thought generated by the patient 2 (e.g., actual or imagined muscle movement, thinking of a memory, a task, etc.) In the case of an exogenous signal, as shown in FIG. 1B, the patient can take action to initiate a signal (e.g., triggering an external device that generates a specific signal). As shown, the monitored signal 18 changes at point 174, which corresponds in time to when the timing indicator 112 intersects the first identified cue point.

Figure 2D:
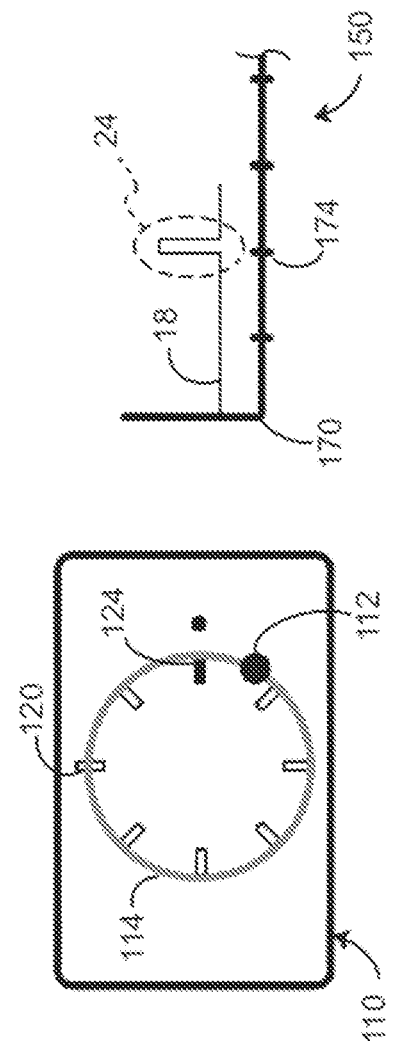
Figure 2D:

FIG. 2D illustrates the timing indicator 112 passing the first identified cue point 124 and an associated evidence signal 24. As noted above, the evidence signal 24 not only comprises a unique profile but also includes a temporal aspect as being spaced in time from point 170 (corresponding to the initial reference point 120 on the path 114). So, the system assesses a portion of the monitored signal, corresponding in time to when the timing indicator moves from the initial reference point 120 to (or just beyond) the first identified cue point 124). The system then assesses the portion for an evidence 24 signal that occurs towards an end of this review portion. The system then compares this evidence signal 24 to a predetermined signal pattern, and if there is an acceptable match, the system can execute a command to any device where the command is associated with the first identified cue point. It is noted that the display 110 can continue to show the timing indicator 112, continuing on the path 114 for a full cycle until it reaches the initial reference point 120. However, assessment of the signal 18 during that cycle will stop because the first identified cue point is the only cue point in this particular cycle.

Figure 3:
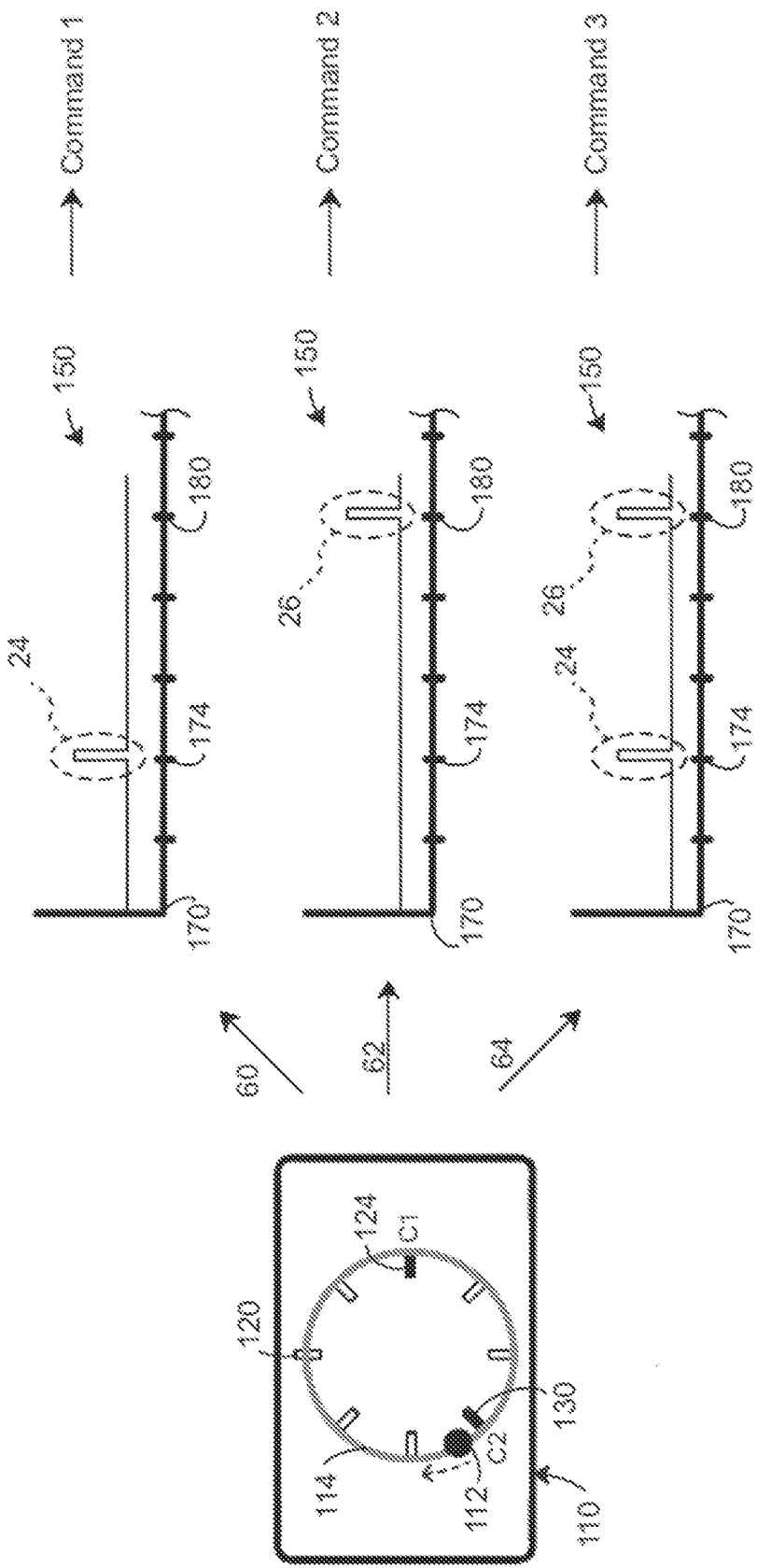
FIG. 3 illustrates an example of a method and system for interfacing an individual with a control system where the display shows a timing indicator moving from an initial reference point over a path and where the path includes a first identified cue point and a second identified cue point.

FIG. 3 illustrates an example of a method and system for interfacing an individual with a control system where the display 110 shows a timing indicator 112 moving from an initial reference point 120 over a path 114 where the path 114 includes a first identified cue point 124 and a second identified cue point 130. The example shows three scenarios, 60, 62, 64, of issuing commands using the interface. As noted herein, an individual using the interface shown in the example of FIG. 3 can generate three different commands (command 1, command 2, command 3) using a single signal that is generated by the individual. For example, in the case of a BCI implanted within an individual having little or no ability to move, the individual can generate a thought to produce an electrical impulse, where this same thought can be used to issue one of three commands depending on the timing of the thought with the information on the display 110. The individual will be informed that separate commands will be generated by issuing a signal at the first identified cue point 124, the second identified cue point 130, or both identified cue points 124, 130.

For example, under the first scenario, 60, the individual generates a signal at the first identified cue point 124 to produce an evidence signal 24. The system must wait until the indicator 112 passes through the second identified cue point 130, and since no additional signals are present, the system issues command 1. Similarly, under the second scenario 62, if the system observes an evidence signal 26 at a time point 180 corresponding to the second identified cue point 130, then the system issues command 2. In the third scenario, 64, the system identifies two evidence signals, 24 and 26, at the appropriate time points 174, 180 and generates command 3. As noted above, the system will compare the evidence signals 24, 26 to predetermined signal patterns to confirm the intent of the individual to issue the appropriate command.

Figure 4A:
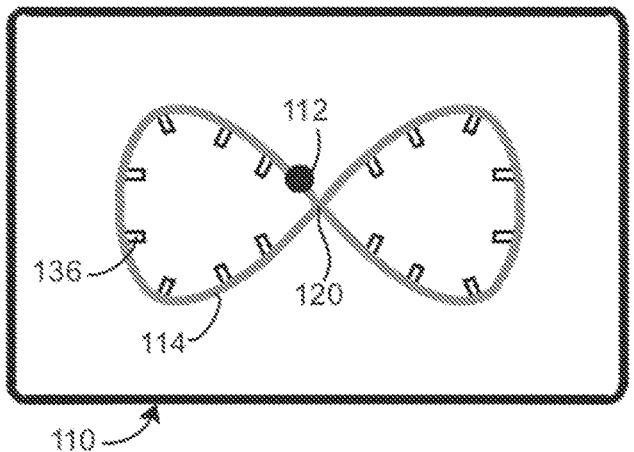
FIGS. 4A to 4C show additional examples of displays with timing indicators moving along the varying paths.
Figure 4B:
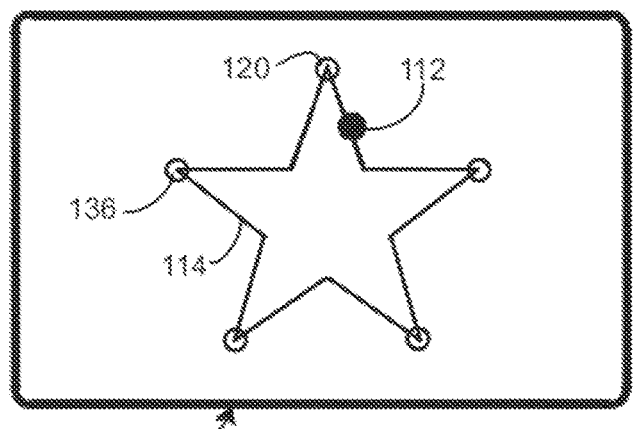
Figure 4C:
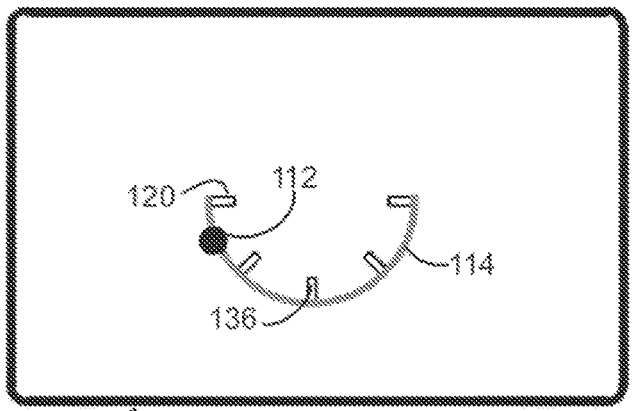

FIGS. 4A to 4C show additional examples of displays 110 with timing indicators 112 moving along the varying paths 114, which have a number of cue points 136 distributed along the paths. As noted herein, the outline of the paths 114 can be hidden as long as the timing indicators 112 follow the respective paths. The initial reference point 120 can be arbitrary so long as the signal is assessed from the initial reference point 120 to the last identified cue point (no identified cue points are shown in FIGS. 4A to 4C). Moreover, the direction of the timing indicator 112 can be clockwise, counterclockwise, or change direction after each cycle. For example, in FIG. 4C, the path is a semi-circular line, so the timing indicator 112 can reverse direction after movement through the path 114 or can simply restart from the same initial reference point 120 after completing movement over the path.

Figure 5A:
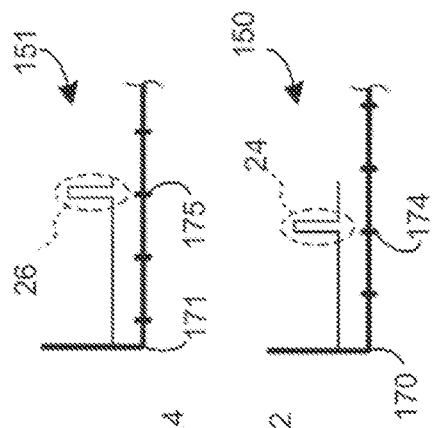
FIGS. 5A and 5B illustrate an additional variation of systems and methods allowing for an individual to interface with a control system.
Figure 5A:
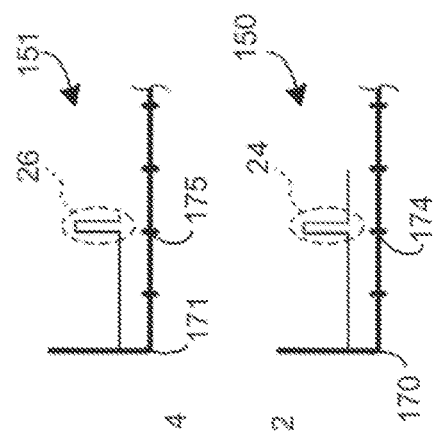
Figure 5A:
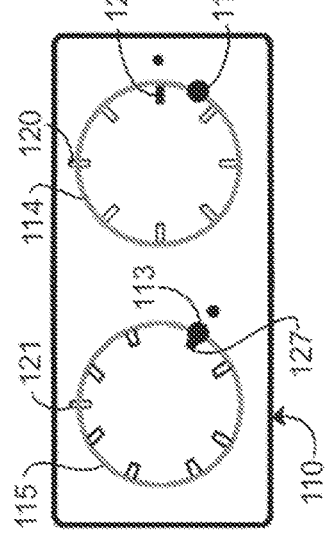
Figure 5A:
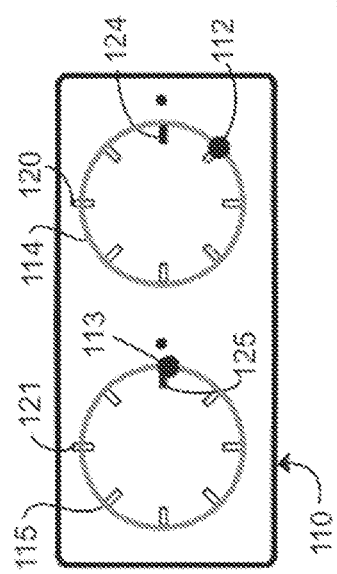
Figure 5A:
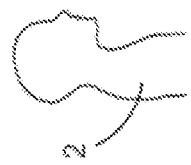
Figure 5B:
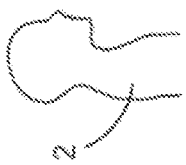

FIGS. 5A and 5B illustrate an additional variation of systems and methods allowing for an individual 2 to interface with a control system. In these variations, the interface 110 includes two or more timing indicators 112, 113 that move about respective paths 114, 115. Each of the respective paths 114, 115 includes any number of cue points with at least one cue point 124, 127 identified on each path 114, 115. However, each path 114, 115 will be offset such that the identified cue points 124, 127 can be selected by the user 2 at different times. In the illustration of FIG. 5A, the timing indicators 112 and 113 both start from their respective initial reference points 120, 121 at the same time. However, the cue points on path 115 are offset from path 114. Therefore, the signal response graph 150 associated with path 114 will have time points 174 that are offset from a signal response graph 151 that is associated with path 115. As shown, the time points 174 and 175 are offset in relation to their respective initial time points 170, 171.

In FIG. 5B, paths 114 and 115 are similar (e.g., the cue points are not offset), but in this example, the timing indicators 112, 114 start from their respective initial reference points 120, 121 at different times. In the illustrated variation, timing indicator 113 lags timing indicator 112. Therefore, the signal response graph 151 associated with path 115 also lags the signal response graph 150 associated with path 114.

FIGS. 6A and 6B illustrate a system 100 where the signal 20 (e.g., an endogenous signal) includes a significant amount of noise. Ideally, when the patient generates a signal 20 at the appropriate time by using the visual display 110, the system 100 will compare an evidence signal 18 taken from the monitoring signal 20 and compares that to a predetermined signal pattern 80, where if the evidence signal 18 sufficiently matches the predetermined signal pattern (allowing for some error), then the system 100 can confirm the intent of the individual and issue the associated command by using any number of algorithms 70 to compare the signals.

In some BCI systems, the individual generates a signal pattern that includes random noise associated with the signal intended to be generated by the individual 2. Factors responsible for such noise can range from a variety of mechanical, electrical, and physiological factors. In order to address this issue, the system 100 can include building and/or adjusting a predetermined signal pattern 80 using one or more previously evidence signal patterns 18. As shown in FIG. 6B, during initial setup of the system 100 or during a maintenance mode, the system can run a number of trials 90, where each trial produces an evidence signal 18, upon confirming intent, the system can then compile any number of evidence signals 18 to produce or modify a predetermined signal pattern.

Therefore, the predetermined signal pattern comprises patterns of signal over many trials. The signal component of a noisy signal can be highlighted by averaging across the trials. The 'evidence' of the signal builds over the number of trials. At each iteration of evidence being built up, a mathematical model(s) can be used to predict the user's intent based on the evidence. The likely characteristics of a predictable signal generated at a specific cue point relative to the reference point can be modeled (e.g., to produce a template). Then, the similarity between the template and the evidence can be calculated to produce a metric. This metric then can be passed on to another mathematical model to determine what the user's intent was at the end of each trial window.

FIGS. 7A to 7E illustrates another variation of an interface display 200 having a vector cursor control 210 used for improving the ability of a paralyzed individual, or those individuals with severe mobility disabilities, to achieve robust and fast multi-dimensional directional control of a cursor. The cursor control can be used in any device where digital device access is enabled (e.g., mouse, remote, spellers, vehicles, robotic prosthetics; an example of mouse cursor control shall be used from this point onwards for ease of comprehension). As noted above, an individual that is able to generate a single discrete binary output through brain-computer interfaces can use the vector cursor control 210. Moreover, individuals with unilateral hand paresis that are still able to generate reliable directional control signals via a modified joystick can combine the vector cursor 210 with additional switches.

Figure 7A:
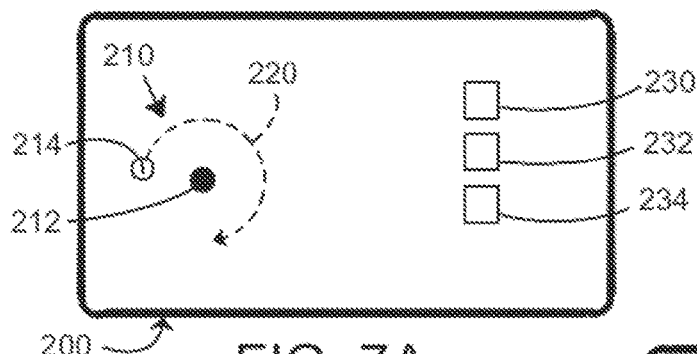
FIGS. 7A to 7E illustrates another variation of an interface display having a vector cursor control used for improving the ability of a paralyzed individual, or those individuals with severe mobility disabilities, to achieve robust and fast multi-dimensional directional control of a cursor.

FIG. 7A illustrates a display 200 with a vector cursor 210 comprising a cursor 212 and directional vector indicator 214 that moves about the cursor 212. In the illustrated variation, the directional vector indicator 214 moves in a circular path 220 about the cursor. However, additional patterns are within the scope of this disclosure. FIG. 7A illustrates a situation where the vector cursor 210 is in a released configuration (e.g., the individual controlling the vector cursor 210 has not triggered the system. FIG. 7A also illustrates three checkboxes 230, 232, 234 for illustrative purposes to show how an individual navigates the vector cursor 210 towards the desired region.

Figure 7B:
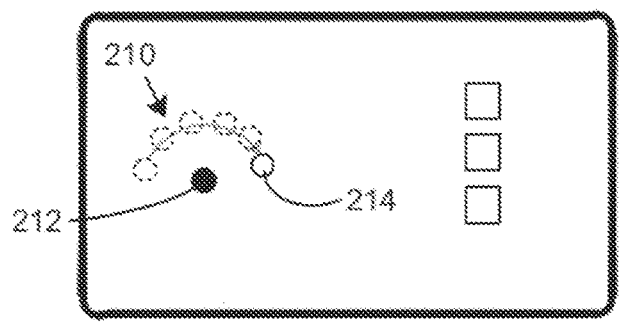

FIG. 7B illustrates the directional vector indicator 214 moving as shown. Once the directional vector indicator 214 is in a desired position, the individual activates a switch (as discussed above, the activation can be a mechanical switch or neural signal.) An analogy of a switch is utilized for the scenario where the user is able to only generate a single binary output. The state where the switch is pressed down is one state of the binary output, and the state where the switch is up is the other state of the binary output. The directional vector indicator 214 rotates automatically about the cursor 212 at some pre-defined rate.

Figure 7C:
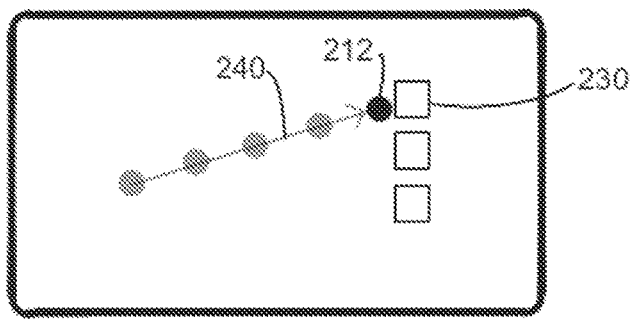

Once the switch is activated, FIG. 7C illustrates the cursor 212 moving along the vector 240 established when the system was triggered (e.g., FIG. 7B). As shown, the cursor 212 moves towards a selection box 230, and when the cursor is properly situated (e.g., FIG. 7D), the individual releases the switch. This release causes the vector cursor 210 to stop moving while the directional vector indicator 214 continues to move about the cursor 212 in the illustrated path.

Figure 7D:
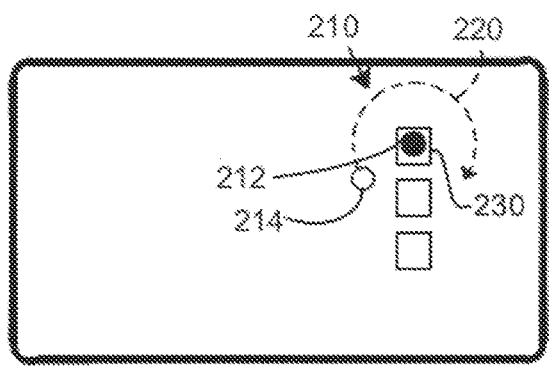
Figure 7E:
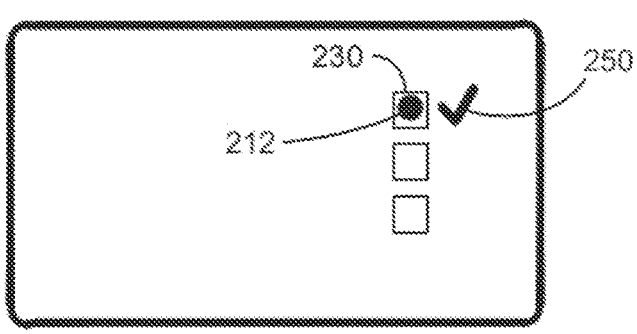

The vector cursor 210 can be coupled with a variety of interaction mechanisms to generate actions at the point of the cursor 230 shown in FIGS. 7D and 7E. For example, if the cursor 212 remains stationary or within a pre-defined radius, for a pre-defined duration, the action occurs at the point of the cursor (e.g., left click, right click, double click, menu pop up) as shown by checkmark 250. If there are additional discrete events that the user can generate, then those can be used to perform the action(s).

The claims are not limited to the exemplary variations shown in the drawings but instead may claim any feature disclosed or contemplated in the disclosure as a whole. Any elements described herein as singular can be pluralized (i.e., anything described as "one" can be more than one). Any species element of a genus element can have the characteristics or elements of any other species element of that genus. Some elements may be absent from individual figures for reasons of illustrative clarity. The above-described configurations, elements or complete assemblies and methods and their elements for carrying out the disclosure, and variations of aspects of the disclosure can be combined and modified with each other in any combination, and each combination is hereby explicitly disclosed. All devices, apparatuses, systems, and methods described herein can be used for medical (e.g., diagnostic, therapeutic, or rehabilitative) or non-medical purposes. The words "may" and "can" are interchangeable (e.g., "may" can be replaced with "can," and "can" can be replaced with "may"). Any range disclosed can include any subrange of the range disclosed. For example, a range of 1-10 units can include 2-10 units, 8-10 units, or any other subrange. Any phrase involving an "A and/or B" construction can mean (1) A alone, (2) B alone, (3) A and B together, or any combination of (1), (2), and (3), for example, (1) and (2), (1) and (3), (2) and (3), and (1), (2), and (3). For example, the sentence "the module 10 (e.g., the host device 16) can be in wired and/or wireless communication with the one or multiple end applications 12" in this disclosure can include (1) the module 10 (e.g., the host device 16) can be in wired communication with the one or multiple end applications 12, (2) the module 10 (e.g., the host device 16) can be in wireless communication with the one or multiple end applications 12, (3) the module 10 (e.g., the host device 16) can be in wired and wireless communication with the one or multiple end applications 12, or any combination of (1), (2), and (3).

What is claimed:

1. A method of controlling a brain computer interface, the method comprising:
   providing a visual display to an individual, where the visual display includes a timing indicator, an initial reference point and a first identified cue point associated with a first command, the first identified cue point being spaced along a path at a first distance from the initial reference point, the visual display configured to show the timing indicator moving along an entirety of the path starting at the initial reference point and ending after a path length, where time of movement of the timing indicator over the first distance comprises a first duration time;

obtaining a monitoring signal from the individual while displaying the visual display;

establishing a first review portion of the monitoring signal starting at an initial time that corresponds to when the timing indicator is at the initial reference point and ending after the first duration time;

assessing the first review portion for a first evidence signal that occurs within the first review portion; and issuing the first command from the brain computer interface if the first evidence signal matches a first predetermined signal pattern.

2. The method of claim 1, wherein the visual display further comprises a second identified cue point associated with a second command, where the second identified cue point is spaced along the path at a second distance from the initial reference point, where the second distance is greater than the first distance and where time of movement of the timing indicator over the second distance comprises a second duration time;

establishing a second review portion of the monitoring signal starting at the initial time and ending after the second duration time;

obtaining a second evidence signal that occurs towards an end of the second review portion; and issuing the second command in the brain computer interface if the second evidence signal matches a second predetermined signal pattern.

3. The method of claim 2, wherein the first predetermined signal pattern and the second predetermined signal pattern are similar.

4. The method of claim 2, wherein the first predetermined signal pattern is different from the second predetermined signal pattern.

5. The method of claim 1, wherein providing the visual display to the individual comprising showing a non-identified cue point that is spaced along the path from both from the initial reference point and the first identified cue point.

6. The method of claim 1, further comprising associating non-identified cue point with an additional command.

7. The method of claim 1, wherein the first predetermined signal pattern is compiled from one or more previously accumulated evidence signal patterns.

8. The method of claim 1, further comprising altering the first predetermined signal pattern using the first evidence signal.

9. The method of claim 1, wherein monitoring the individual to obtain the monitoring signal comprises monitoring the individual for a signal selected from a group consisting of an endogenous neural signal from the individual, an auditory signal from the individual, a physical movement of a body part of the individual, and a key selection by the individual.

10. The method of claim 9, wherein the endogenous neural signal comprises a signal generated by a neural implant in the individual configured to detect neural activity.

11. The method of claim 10, wherein the neural activity comprises neural activity selected from a group consisting of an affirmative thought, movement of a body part, and imagined movement of a body part.

12. The method of claim 1, wherein the timing indicator continuously moves along the path on the visual display.

13. A system controlling a brain computer interface, the system comprising:

a device for monitoring an individual, the device configured to obtain a monitoring signal over a time period;

a control system for recording the monitoring signal;

a visual display viewable by the individual and comprising a timing indicator, an initial reference point and a first identified cue point associated with a first control command, where the visual display shows the timing indicator moving along a path that starts at the initial reference point and ends after a path length, where movement of the timing indicator over the path occurs after a cycle time, where the first identified cue point is spaced from the initial reference point along the path by a first distance such that a first duration time comprises a time of movement of the timing indicator from the initial reference point to the first identified cue point;

wherein the control system is configured to:

select an evidence signal from the monitoring signal by selecting a portion of the monitoring signal starting at when the timing indicator is at the initial reference point;

evaluate the evidence signal for a first predetermined signal pattern occurring after the first duration time from a start of the evidence signal; and generate a first confirmation signal in the brain computer interface only upon identifying the first predetermined signal pattern during evaluating the evidence signal, where the first confirmation signal confirms selection of the first control command by the individual.

14. The system of claim 13, wherein the visual display further comprises a second identified cue point associated with a second command, where the second identified cue point is spaced along the path at a second distance from the initial reference point, where the second distance is greater than the first distance and where the time of movement of the timing indicator over the second distance comprises a second duration time;

wherein the control system is configured to:

establish a second review portion of the monitoring signal starting at the initial reference point and ending after the second duration time;

obtain a second evidence signal that occurs towards an end of the second review portion; and issue the second command in the brain computer interface if the second evidence signal matches a second predetermined signal pattern.

15. The system of claim 13, wherein the control system is configured to compile the first predetermined signal pattern from one or more previously accumulated evidence signal patterns.

16. The system of claim 13, wherein the monitoring signal comprises a signal selected from a group consisting of an endogenous neural signal from the individual, an auditory signal from the individual, a physical movement of a body part of the individual, and a key selection by the individual.

17. The system of claim 16, wherein the endogenous neural signal comprises a signal generated by a neural implant in the individual configured to detect neural activity.

18. The system of claim 17, wherein the neural activity comprises neural activity selected from a group consisting of an affirmative thought, movement of a body part, and imagined movement of a body part.

19. The system of claim 13, wherein the visual display is configured such that the timing indicator continuously moves along the path on the visual display.

* * * * *